(12) United States Patent
Takahashi et al.

(10) Patent No.: US 11,790,576 B2
(45) Date of Patent: Oct. 17, 2023

(54) MEDICAL IMAGE PROCESSING APPARATUS AND MEDICAL IMAGE PROCESSING METHOD

(71) Applicant: Hitachi, Ltd., Tokyo (JP)

(72) Inventors: Hisashi Takahashi, Tokyo (JP); Taiga Gotou, Tokyo (JP); Koichi Hirokawa, Tokyo (JP)

(73) Assignee: FUJIFILM HEALTHCARE CORPORATION, Chiba (JP)

( * ) Notice: Subject to any disclaimer, the term of this patent is extended or adjusted under 35 U.S.C. 154(b) by 0 days.

(21) Appl. No.: 16/887,708

(22) Filed: May 29, 2020

(65) Prior Publication Data

US 2021/0097736 A1 Apr. 1, 2021

(30) Foreign Application Priority Data

Sep. 26, 2019 (JP) .................. 2019-175770

(51) Int. Cl.
*G06T 11/00* (2006.01)
*G06T 7/00* (2017.01)

(52) U.S. Cl.
CPC .......... *G06T 11/005* (2013.01); *G06T 7/0012* (2013.01); *G06T 2207/10081* (2013.01); *G06T 2207/30004* (2013.01)

(58) Field of Classification Search
CPC ............... G06T 11/005; G06T 7/0012; G06T 2207/10081; G06T 2207/30004; G06T 5/002; G06T 5/50; G06T 2207/20182; G06T 11/003; G06T 2207/20224; G06T 2207/20024
See application file for complete search history.

(56) References Cited

U.S. PATENT DOCUMENTS 5,825,846 A * 10/1998 Aach .................. G06T 5/20
378/62
8,687,907 B2 4/2014 Toyoda et al.
(Continued)

FOREIGN PATENT DOCUMENTS

CN 107533755 A 1/2018
JP 2011-239888 A 12/2011
(Continued)

OTHER PUBLICATIONS

Notice of Reasons for Refusal, dated Mar. 28, 2023, for Japanese Application No. 2019-175770 (with English translation).
(Continued)

*Primary Examiner* — Samah A Beg
*Assistant Examiner* — Winta Gebreslassie
(74) *Attorney, Agent, or Firm* — Baker Botts L.L.P.

(57) ABSTRACT

A medical image processing apparatus and a medical image processing method capable of improving structural component detectability with respect to a noise component in a medical image. The medical image processing apparatus includes: a separation unit that separates the medical image into a first component including a structural component as a main component and a second component including a noise component as a main component; a modulation unit that modulates the second component with a spatial frequency; and a correction unit that generates a corrected image based on the first component and the modulated second component.

10 Claims, 10 Drawing Sheets

(56) References Cited

U.S. PATENT DOCUMENTS

| | | | |
|---|---|---|---|
| 8,755,585 B2 | 6/2014 | Nakanishi et al. | |
| 9,418,417 B2 | 8/2016 | Kobayashi | |
| 10,546,367 B2 | 1/2020 | Reusch | |
| 11,127,123 B2 | 9/2021 | Takahashi et al. | |
| 2007/0145317 A9* | 6/2007 | Kobayashi | F16K 39/04 251/129.15 |
| 2014/0153692 A1* | 6/2014 | Larkin | G06T 5/50 378/36 |
| 2014/0153803 A1* | 6/2014 | Noda | G06T 7/0012 382/131 |
| 2017/0084058 A1* | 3/2017 | Kim | G06T 5/002 |
| 2017/0345132 A1 | 11/2017 | Schlüter et al. | |
| 2018/0089807 A1* | 3/2018 | Reusch | G06T 5/50 |

FOREIGN PATENT DOCUMENTS

| | | |
|---|---|---|
| JP | 2014-236810 A | 12/2014 |
| JP | 2017-535353 A | 11/2017 |
| JP | 2019-088735 A | 6/2019 |
| WO | WO 2010/086973 A1 | 8/2010 |

OTHER PUBLICATIONS

Office Action, dated May 17, 2023, for Chinese Application No. 202010503352.4 (with partial English translation).

* cited by examiner

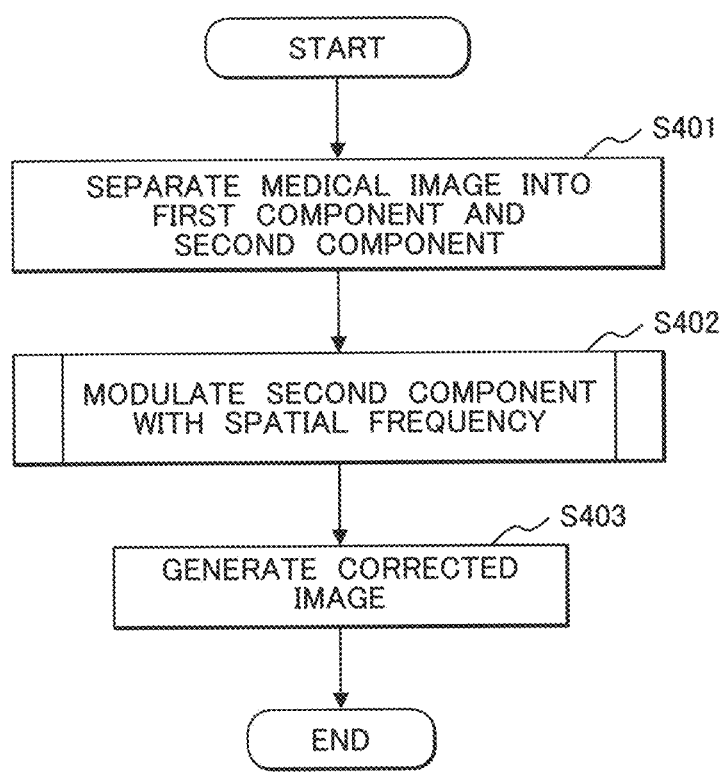

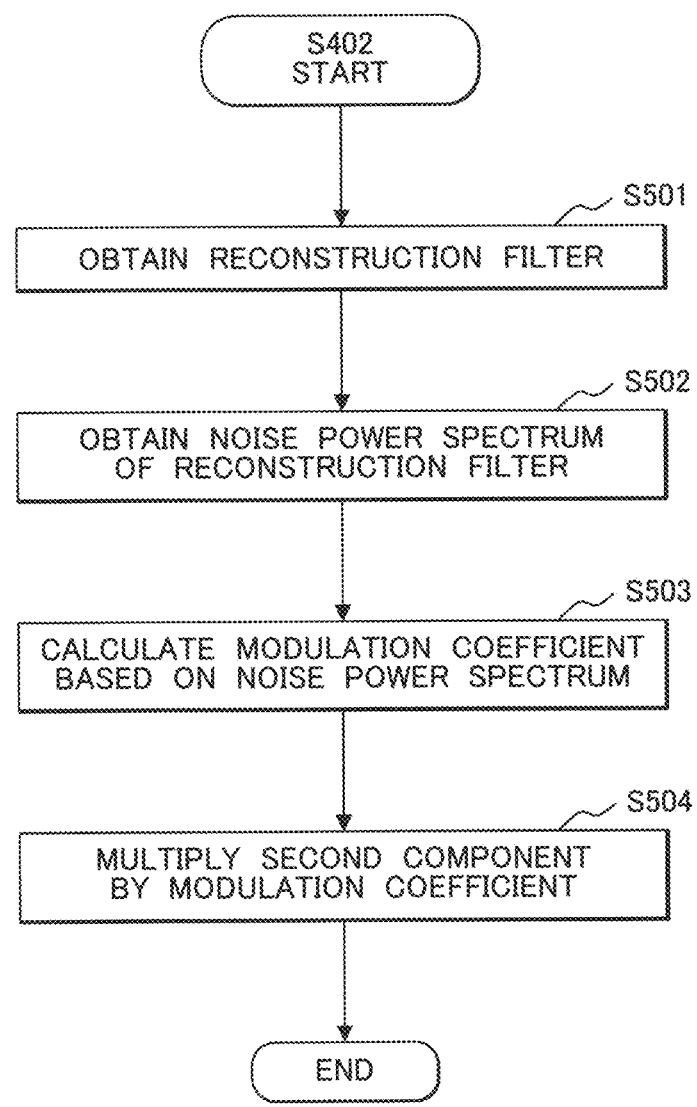

FIG.6A
LOW-PASS RECONSTRUCTION FILTER
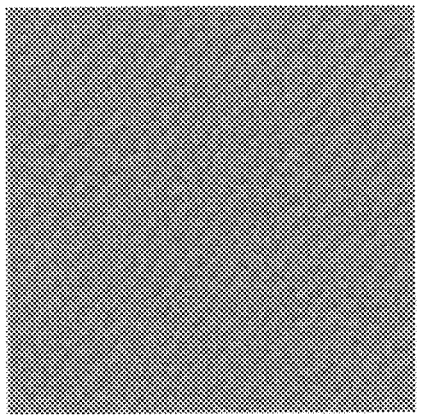
TOMOGRAPHIC IMAGE
(NOISE COMPONENT)
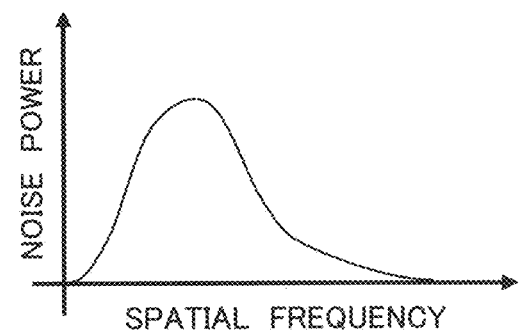
FIG.6B
HIGH-PASS RECONSTRUCTION FILTER
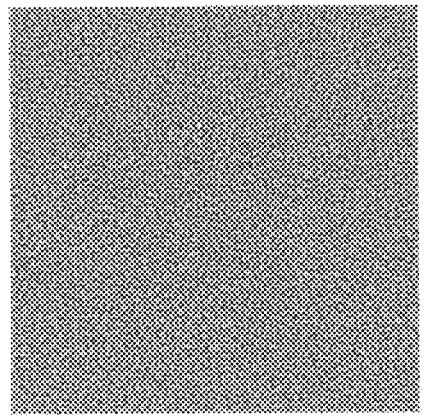
TOMOGRAPHIC IMAGE
(NOISE COMPONENT)
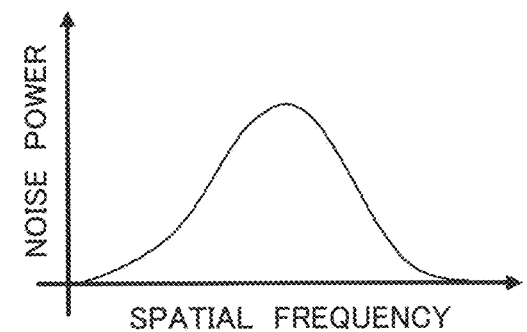

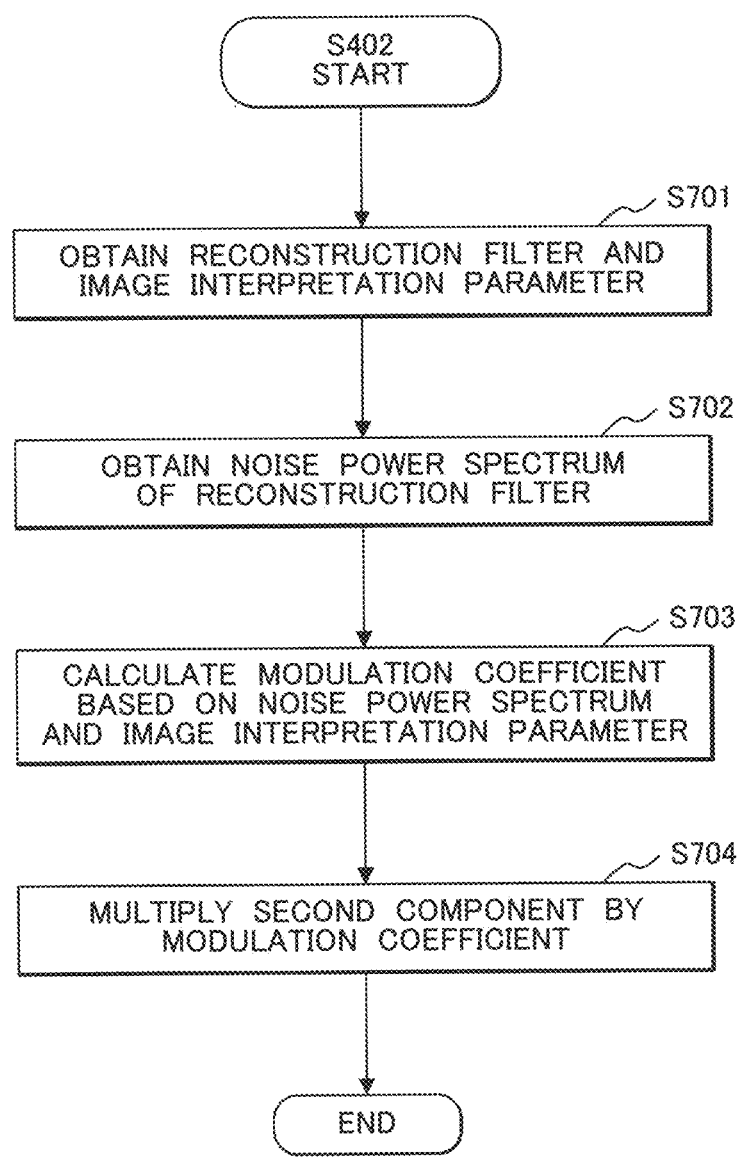

RECONSTRUCTION FILTER NPS

SETTING OF CENTRAL FREQUENCY

SETTING OF FREQUENCY BAND

SETTING OF MODULATION INTENSITY

DIFFERENCE

NORMALIZATION

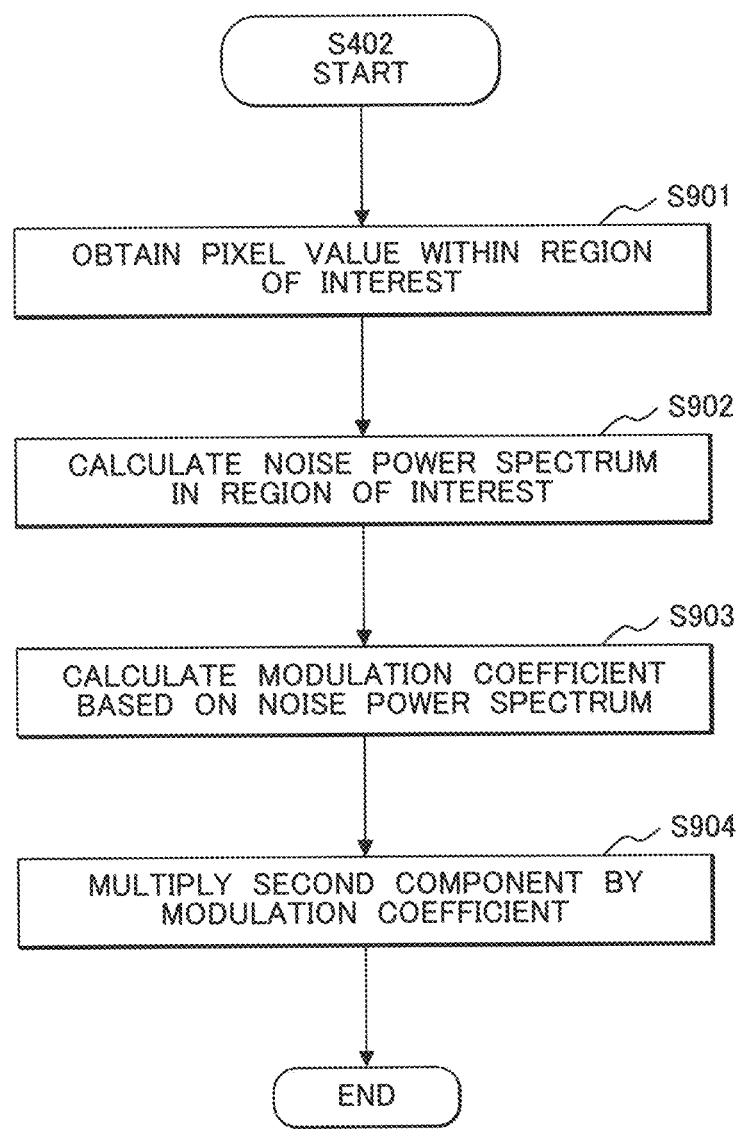

MEDICAL IMAGE PROCESSING APPARATUS AND MEDICAL IMAGE PROCESSING METHOD

CLAIM OF PRIORITY

The present application claims priority from Japanese Patent Application JP 2019-175770 filed on Sep. 26, 2019, the content of which are hereby incorporated by references into this application.

BACKGROUND OF THE INVENTION

The present invention relates to a medical image processing apparatus and a medical image processing method for handling a medical image obtained with a medical imaging device such as an X-ray CT (Computed Tomography) device, and more particularly to a technique of improving structural component detectability with respect to a noise component in a medical image.

BACKGROUND ART

The X-ray CT device as an example of the medical imaging device obtains projection data at multiple projection angles by X-ray irradiation from positions around a subject, and reconstructs a tomographic image of the subject by back-projection of the projection data. The reconstructed tomographic image is used in image diagnosis of the subject as a medical image. In the medical image, each pixel includes a structural component representing the structure of a tissue in the subject and a noise component occurred in the X-ray measurement process or the like. Since the noise component disturbs identification of the structural component and is obstructive to the image diagnosis, a technique of reducing the noise component has been developed.

Japanese Unexamined Patent Application Publication (Translation of PCT Application) No. 2017-535353 discloses normalizing multiple spatial frequency component images, generated from a medical image, by using respective noise models, and attenuating the normalized pixel value within a range where the normalized pixel value as a pixel value of the normalized spatial frequency component image is small. In the range where the normalized pixel value is small, since priority of the noise component with respect to the structural component is statistically expected, reduction of the noise component with respect to the structural component can be expected by attenuating the normalized pixel value in the small range.

However, in Japanese Unexamined Patent Application Publication (Translation of PCT Application) No. 2017-535353, since each spatial frequency component image including the structural component and the noise component is amplified or attenuated, it is not always possible to improve the structural component detectability with respect to the noise component in the medical image.

SUMMARY OF THE INVENTION

The present invention has been made in consideration of the above situation, and provides a medical image processing apparatus and a medical image processing method capable of improving structural component detectability with respect to a noise component in a medical image.

According to the present invention, the foregoing object is attained by providing a medical image processing apparatus for handling a medical image, including: a separation unit that separates the medical image into a first component including a structural component as a main component and a second component including a noise component as a main component; a modulation unit that modulates the second component with a spatial frequency; and a correction unit that generates a corrected image based on the first component and the modulated second component.

Further, the present invention provides a medical image processing method for handling a medical image including: separating the medical image into a first component including a structural component as a main component and a second component including a noise component as a main component; modulating the second component with a spatial frequency; and generating a corrected image based on the first component and the modulated second component.

According to the present invention, it is possible to provide a medical image processing apparatus and a medical image processing method capable of improving structural component detectability with respect to a noise component in a medical image.

BRIEF DESCRIPTION OF THE DRAWINGS

FIG. 4 is a flowchart showing an example of the flow of processing of a medical image processing method;

FIG. 5 is a flowchart showing an example of the flow of processing of a frequency modulation step according to a first embodiment of the present invention;

FIGS. 6A and 6B illustrate tomographic images reconstructed by using different reconstruction filters and examples of noise power spectrum;

FIG. 7 is a flowchart showing an example of the flow of processing of the frequency modulation step according to a second embodiment of the present invention;

FIG. 9 is a flowchart showing an example of the flow of processing of the frequency modulation step according to a third embodiment of the present invention.

DETAILED DESCRIPTION OF THE PREFERRED EMBODIMENTS

Figure 1:
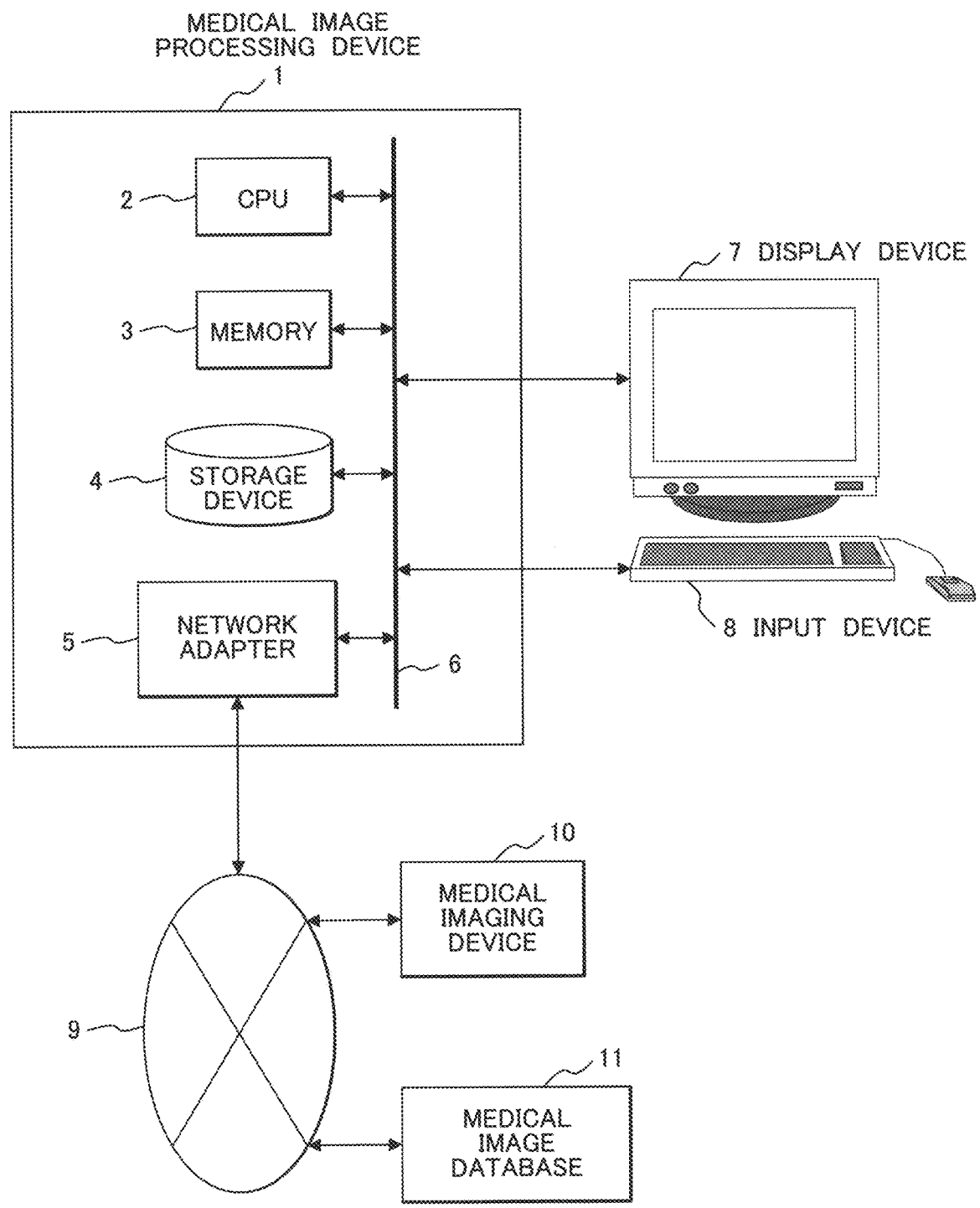
FIG. 1 is a whole constitution diagram of a medical image processing apparatus.

Hereinbelow, embodiments of a medical image processing apparatus and a medical image processing method according to the present invention will be described in accordance with the accompanying drawings. Note that in the following descriptions and drawings, constituent elements having the same functional composition will have the same reference numerals, and overlapped explanations will be omitted.

First Embodiment

FIG. 1 shows a hardware configuration of a medical image processing apparatus 1. The medical image processing apparatus 1 has a CPU (Central Processing Unit) 2, a memory 3, a storage device 4, and a network adapter 5. These constituent elements are signal-transmissibly/receivably connected to each other via a system bus 6. Further, the medical image processing apparatus 1 is signal-transmissibly/receivably connected to a medical imaging device 10 and a medical image database 11 via a network 9. Further, the medical image processing apparatus 1 is connected to a display device 7 and an input device 8. Note that "signal-transmissibly/receivably" means a state where mutual or one-to-the other signal transmission/reception is possible electrically or optically regardless of cable or wireless communication.

The CPU 2 controls operations of the respective constituent elements. The CPU 2 loads programs and data necessary for execution of the programs, stored in the storage device 4, onto the memory 3, executes the programs, and performs various image processing on the medical images. The memory 3 holds a development process of the program or arithmetic processing performed with the CPU 2. The storage device 4 holds the programs performed with the CPU 2 and data necessary for execution of the programs. More specifically, the storage device 4 is an HHD (Hard Disk Drive), an SSD (Solid State Drive), or the like. The network adapter 5 is used for connecting the medical image processing apparatus 1 to the network 9 such as a LAN (Local Area Network), a telephone line, the Internet, or the like. The various types of data handled with the CPU 2 may be transmitted/received to/from the outside of the medical image processing apparatus 1 via the network 9 such as a LAN.

The display device 7 displays the result of processing with the medical image processing apparatus 1 and the like. More specifically, the display device 7 is a liquid crystal display or the like. The input device 8 is an operation device for an operator to issue an operation instruction to the medical image processing apparatus 1. Specifically, the input device 8 is a keyboard, a mouse, a touch panel, and the like. The mouse may be replaced with another pointing device such as a track pad, a track ball, or the like.

The medical imaging device 10 is an X-ray CT (Computed Tomography) device to obtain projection data from e.g. a subject and reconstruct a tomographic image from the projection data. The medical imaging device 10 will be described later by using FIG. 2. The medical image database 11 is a database system to hold the projection data obtained with the medical imaging device 10, the tomographic image, and the like.

Figure 2:
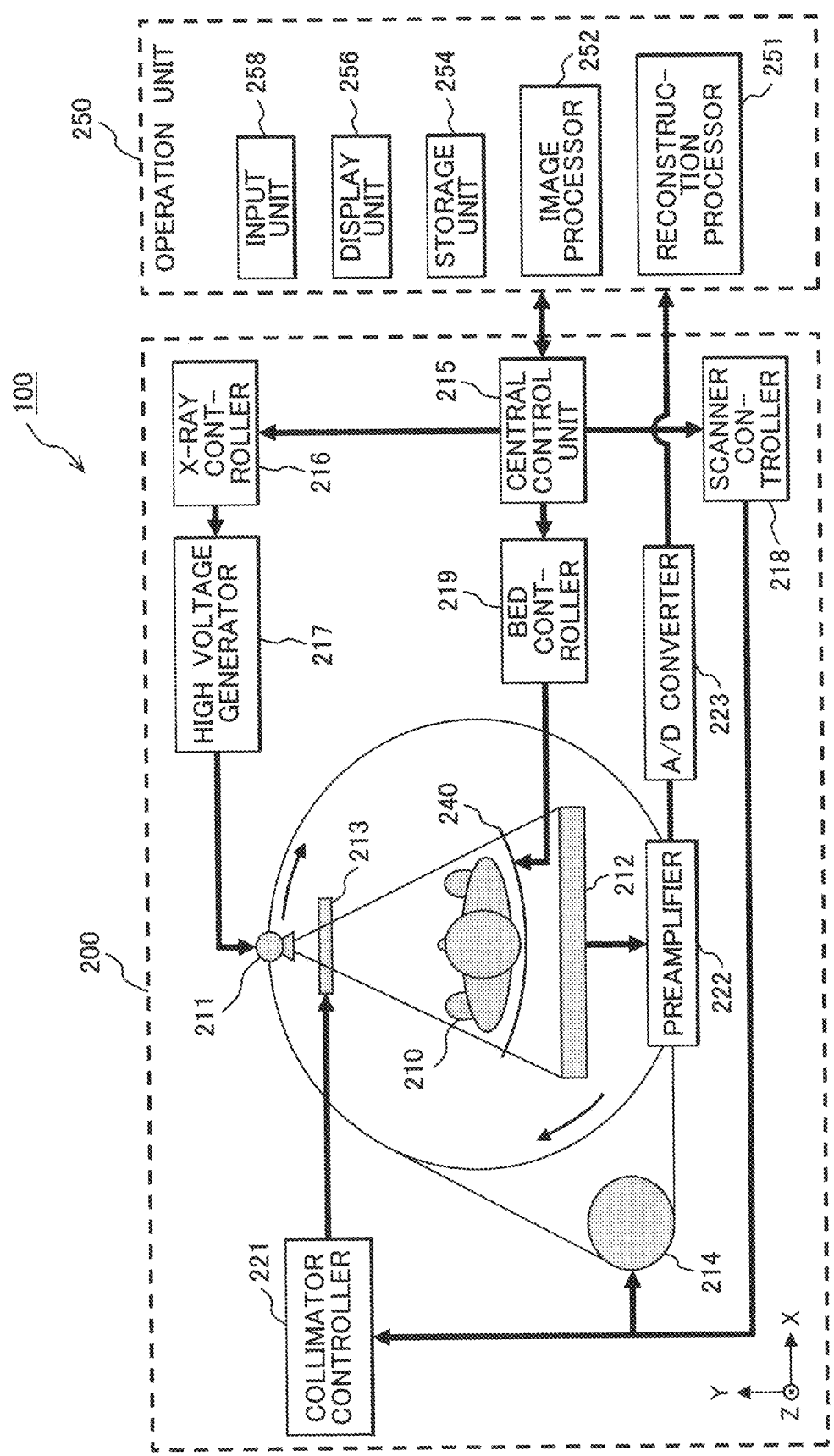
FIG. 2 is a whole constitution diagram of an X-ray CT device as an example of a medical imaging device.

The whole constitution of an X-ray CT device 100 as an example of the medical imaging device 10 will be described by using FIG. 2. Note that in FIG. 2, an X axis indicates a lateral direction, a Y axis indicates a longitudinal direction, and a Z axis indicates a direction vertical to a paper surface. The X-ray CT device 100 has a scanner 200 and an operation unit 250. The scanner 200 has an X-ray tube 211, a detector 212, a collimator 213, a driver 214, a central controller 215, an X-ray controller 216, a high voltage generator 217, a scanner controller 218, a bed controller 219, a collimator controller 221, a preamplifier 222, an A/D converter 223, a bed 240, and the like.

The X-ray tube 211 irradiates the subject 210 placed on the bed 240 with an X-ray. In accordance with a control signal transmitted from the X-ray controller 216, a high voltage generated with the high voltage generator 217 is applied to the X-ray tube 211, and the subject is irradiated with the X-ray from the X-ray tube 211.

The collimator 213 limits an irradiation range of the X-ray emitted from the X-ray tube 211. The irradiation range of the X-ray is set in accordance with a control signal transmitted from the collimator controller 221.

The detector 212 detects the X-ray transmitted through the subject 210, to measure the spatial distribution of the transmitted X-ray. The detector 212 is provided opposingly to the X-ray tube 211. A large number of detection elements are two-dimensionally arrayed on a surface of the detector 212 opposing the X-ray tube 211. A signal measured with the detector 212 is amplified with the preamplifier 222, and converted with the A/D converter 223 into a digital signal. Thereafter, various correction processing is performed on the digital signal, and projection data is obtained.

The driver 214 rotates the X-ray tube 211 and the detector 212 around the subject 210 in accordance with a control signal transmitted from the scanner controller 218. The projection data from multiple projection angles is obtained by irradiation and detection of the X-ray along with the rotation of the X-ray tube 211 and the detector 212. The set of data collection by projection angle is referred to as a "view". The arrangement of the two-dimensionally arrayed respective detection elements of the detector 212 in the rotational direction of the detector 212 is referred to as a "channel", and in the direction orthogonal to the channel, referred to as a "row". The projection data is identified with view, channel, and row.

The bed controller 219 controls the operation of the bed 240. During the irradiation and detection of the X-ray, the bed controller 219 keeps the bed 240 still, and moves the bed 240 at a constant speed in the z axis direction. The scanning while the bed 240 is kept still is referred to as "axial scanning", and the scanning while the bed 240 is moved is referred to as "helical scanning", respectively.

The central controller 215 controls the above-described operation of the scanner 200 in accordance with instructions from the operation unit 250. Next, the operation unit 250 will be described. The operation unit 250 has a reconstruction processor 251, an image processor 252, a storage unit 254, a display unit 256, an input unit 258, and the like.

The reconstruction processor 251 reconstructs a tomographic image by performing back-projection on the projection data obtained with the scanner 200. The image processor 252 performs various image processing so as to make the tomographic image appropriate to diagnosis. The storage unit 254 holds the projection data, the tomographic image, and the image-processed image. The display unit 256 displays the tomographic image and the image-processed image. The input unit 258 is used when the operator sets projection data acquisition conditions (tube voltage, tube current, scanning speed, and the like) and tomographic image reconstruction conditions (reconstruction filter, FOV size, and the like).

Note that the operation unit 250 may be the medical image processing apparatus 1 shown in FIG. 1. In such case, the reconstruction processor 251 and the image processor 252 correspond to the CPU 2. The storage unit 254 corresponds to the storage device 4. The display unit 256 corresponds to the display device 7. The input unit 258 corresponds to the input device 8.

Figure 3:
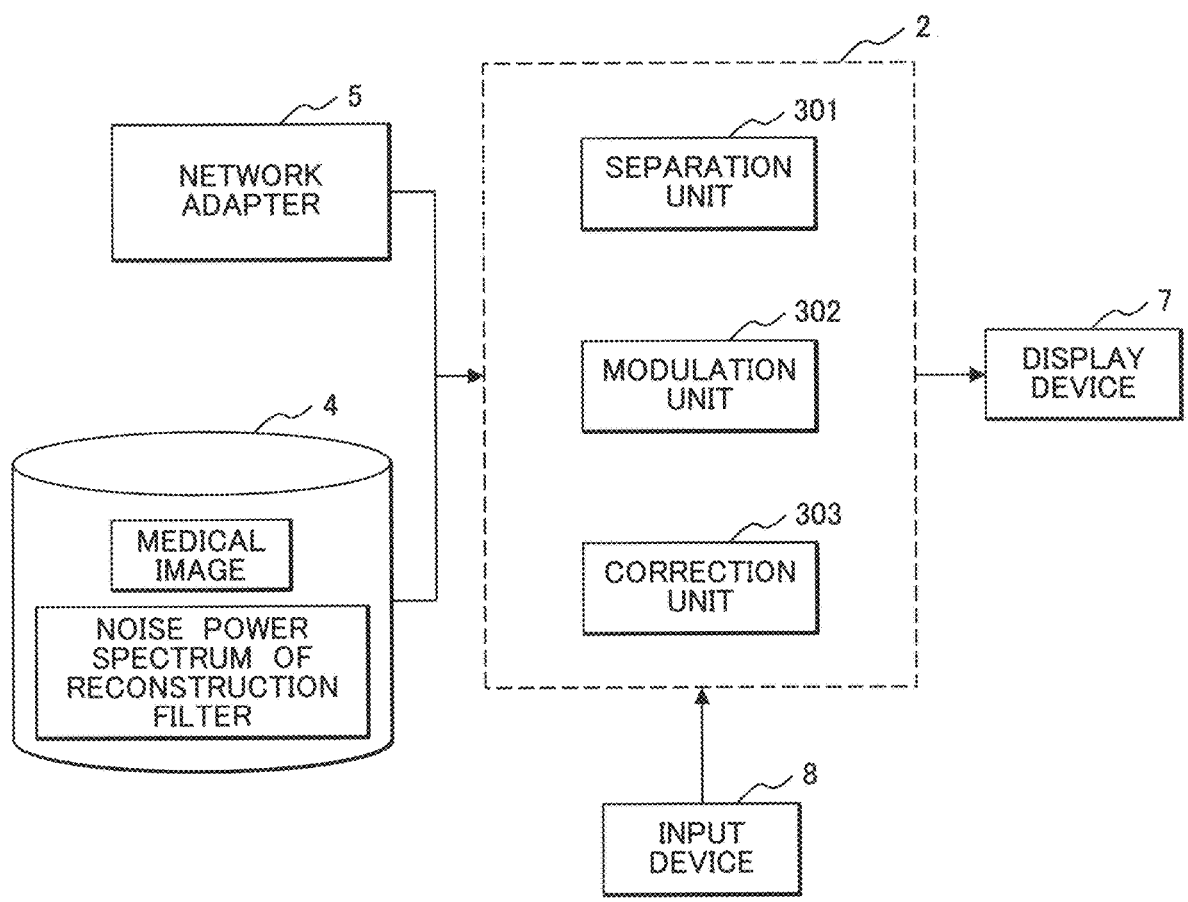
FIG. 3 is a functional block diagram of the medical image processing apparatus.

The functional block diagram of the present embodiment will be described by using FIG. 3. Note that the respective functions shown in FIG. 3 may be configured with specialized hardware, or may be configured with software which runs on the CPU 2. In the following description, the respective functions of the present embodiment are configured with software.

The present embodiment has a separation unit 301, a modulation unit 302, and a correction unit 303. Further, the storage device 4 holds the medical image generated with the X-ray CT device 100, a modulation transfer function (MTF), a noise power spectrum (NPS), for each reconstruction filter, and the like. Hereinbelow, the respective constituent elements will be described.

The separation unit 301 separates the medical image into a first component including a structural component as a main component and a second component including a noise component as a main component. Specifically, the noise component generated in measurement process or the like is mostly removed by performing smoothing processing on the medical image, and the first component is extracted.

Further, the second component is generated by differentiating the first component from the medical image. That is, assuming that I is a medical image, and Smooth( ) is an operator of the smoothing processing, a first component C1 and a second component C2 are obtained with the following expression.

$$C1 = \text{Smooth}(I) \quad (1)$$

$$C2 = I - C1 \quad (2)$$

Note that the structural component as the main component of the first component C1 indicates the structure or the like of the tissue in the subject 210. The noise component as the main component of the second component C2 occurs due to electrical noise of the detector 212, quantum noise of the X-ray, and the like. The distribution profile of the structural component in the spatial frequency direction depends on type of the diagnosis target tissue. For example, in the case of a widespread lesion such as cerebral hemorrhage or liver neoplasm, many low-frequency band components exist, while in the case of a minor lesion such as small pulmonary peripheral lesion or otosclerosis, many high-frequency band components exist. On the other hand, the distribution profile of the noise component in the spatial frequency direction depends on performance and imaging method of the medical imaging device such as detection element size or data collection density in the projection angle direction. Accordingly, it is possible to improve the structural component detectability with respect to the noise component by frequency modulation based on the distribution profiles of the structural component and the noise component.

Note that as the smoothing processing with the separation unit 301, a method using a moving average filter to calculate an average of pixel values of a pixel of interest and its peripheral pixels, a method using a Gaussian filter, a method using an edge preserving type filter, a method using iterative approximation processing, a method using artificial intelligence, and the like, may be used. Further, it may be configured such that prior to the smoothing processing, the amount of noise component in each pixel of the medical image is estimated, and the intensity of the smoothing processing is adjusted in correspondence with the estimated amount of noise component, and the ratio of the structural component included in the first component is raised.

The modulation unit 302 modulates the second component with the spatial frequency. Specifically, the second component decomposed by spatial frequency by Fourier transformation or the like is multiplied by a modulation coefficient by spatial frequency. That is, assuming that f is the spatial frequency, the second component decomposed by spatial frequency is $C2(f)$, and the modulation coefficient by spatial frequency is $a(f)$, the modulated second component is $a(f) \cdot C2(f)$. The modulation coefficient by spatial frequency $a(f)$ is set based on the spatial frequency distribution or the like of the first component C1.

Note that the modulation unit 302 can perform the above processing not only in the above-described frequency space but also in real space. For example, by decomposing C2 by using a Gaussian pyramid or the like to discrete spatial frequency band $j=(1, 2, \ldots, J)$ to generate $C2_j$, and assuming that the modulation coefficient of the corresponding spatial frequency band j is $a_j$, the modulated second component in the j-th spatial frequency band is $a_j \cdot C2_j$.

The correction unit 303 generates a corrected image based on the first component and the modulated second component. Specifically, the corrected image is generated by adding the first component and the modulated second component by spatial frequency. That is, when the first component decomposed by spatial frequency is $C1(f)$, in the corrected image Icorr, a component with respect to the spatial frequency f, Icorr(f), is obtained with the following expression.

$$\text{Icorr}(f) = C1(f) + a(f) \cdot C2(f) \quad (3)$$

Note that in the separation unit 301, when the estimation accuracy of noise component amount is low, or when the separation accuracy of the smoothing processing is low, the first component $C1(f)$ that comes with the spatial frequency f may include a structural component S(f) as a main component, and a part $\Delta N(f)$ of the noise component N(f), and the second component $C2(f)$ may include the noise component N(f) as a main component, and a part $\Delta S(f)$ of the structural component S(f). Accordingly, by expressing the structural component included in the first component $C1(f)$ as $(S(f) - \Delta S(f))$, and the noise component included in the second component $C2(f)$ as $(N(f) - \Delta N(f))$, $C1(f)$ and $C2(f)$ are obtained with the following expressions.

$$C1(f) = (S(f) - \Delta S(f)) + \Delta N(f) \quad (4)$$

$$C2(f) = (N(f) - \Delta N(f)) + \Delta S(f) \quad (5)$$

In this case, the corrected-image frequency component Icorr(f) may be obtained with the following expression using coefficients x and y to adjust the balance between the first component $C1(f)$ and the modulated second component $a(f) \cdot C2(f)$.

$$\text{Icorr}(f) = x \cdot C1(f) + y \cdot a(f) \cdot C2(f) \quad (6)$$

That is, the following relationship is established with the expressions (4), (5), and (6).

$$\text{Icorr}(f) = x \cdot S(f) + (y \cdot a(f) - x) \cdot \Delta S(f) + y \cdot a(f) \cdot N(f) - (y \cdot a(f) - x) \cdot \Delta N(f) \quad (7)$$

The expression (7) indicates that when x is set to be relatively larger than y, the structural component $\Delta S(f)$ erroneously separated as a noise component becomes smaller, while when y is set to be relatively larger than x, the noise component $\Delta N(f)$ erroneously separated as a structural component is suppressed. That is, $\Delta S(f)$ and $\Delta N(f)$ are in a trade-off relationship. The relationship between $\Delta S(f)$ and $\Delta N(f)$ is adjusted by appropriately setting the coefficients x and y. The coefficients x and y may be set by the operator's selection from multiple combinations of the coefficients x and y held in e.g. the storage device 4, via the input device 8 in correspondence with size or imaging part of the subject 210.

Finally, by adding the corrected-image frequency Icorr(f) with regard to the spatial frequency f, the corrected image is generated.

An example of the flow of processing performed in the present embodiment will be described by using FIG. 4. (S401)

The separation unit 301 separates the medical image I into the first component C1 and the second component C2. Specifically, the first component C1 is extracted with the expression (1), and the second component C2 is generated with the expression (2).

(S402)

The modulation unit 302 modulates the second component with the spatial frequency. An example of the flow of processing at the present step will be described by using FIG. 5.

(S501)

The modulation unit 302 obtains a reconstruction filter and its modulation transfer function used in the reconstruction of the medical image I in the reconstruction processor 251. The reconstruction filter, which is superposed on projection data in back-projection processing, changes the spatial frequency distribution of the medical image I. Since the first component C1 separated with the separation unit 301 is mainly the structure of the medical image I, the operator selects a reconstruction filter in correspondence with the first component C1. That is, the reconstruction filter used for reconstruction differs between a part where the structural component is distributed mainly in a low frequency band such as a head or abdominal region and a part where the structural component is distributed in a high frequency band such as a pulmonary area or bone. Generally, the modulation transfer function is used as an index representing the characteristic of the spatial frequency regarding the first component C1 of the medical image I. The modulation transfer function can be calculated by well-known methods. For example, the modulation transfer function is calculated by imaging a phantom including a high-absorption and fine-diameter wire or column with the X-ray CT device 100, and reconstructing a tomographic image with an arbitrary reconstruction filter, and analyzing the tomographic image by a slit method or Radian edge method. The modulation transfer functions for the respective reconstruction filters are stored in the storage device 4.

Figure 10A:
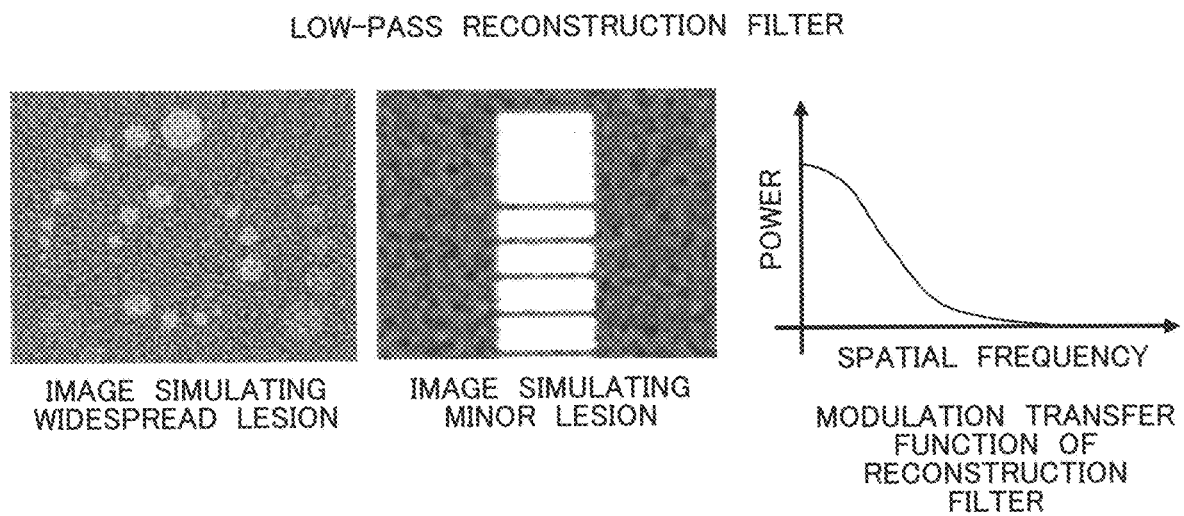
FIGS. 10A and 10B illustrate tomographic images reconstructed by using different reconstruction filters and examples of modulation transfer function.
Figure 10B:
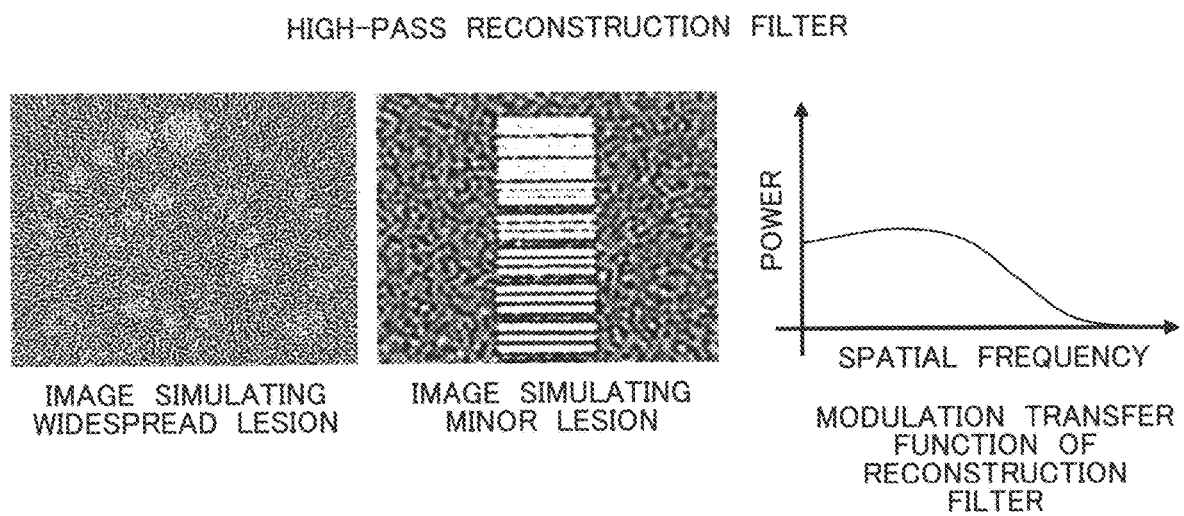

FIGS. 10A and 10B show two types of tomographic images reconstructed by using different reconstruction filters and examples of modulation transfer functions of the respective reconstruction filters. Note that FIG. 10A shows a case of a low-pass reconstruction filter, and FIG. 10B shows a case of a high-pass reconstruction filter. The two types of tomographic images are an image simulating a widespread lesion and an image simulating a minor lesion. It is understood that the visibility of lesion differs between FIG. 10A and FIG. 10B, and that the modulation transfer function of a low-pass reconstruction filter is appropriate to a widespread lesion, while the modulation transfer function of a high-pass reconstruction filter is appropriate to a minor lesion.

(502)

The modulation unit 302 obtains a noise power spectrum of the reconstruction filter obtained at S501. The noise power spectrum can be calculated by well-known methods. For example, imaging is performed with the X-ray CT device 100 on a flat phantom including no structure, and a tomographic image is reconstructed by superposing an arbitrary reconstruction filter on the obtained projection data. Then the noise power spectrum is calculated from the tomographic image by using a virtual slit method or two-dimensional Fourier transformation method. The respective noise power spectra of the multiple reconstruction filters are previously calculated, linked to the respective reconstruction filters, and stored in the storage device 4.

FIGS. 6A and 6B show examples of tomographic images reconstructed by using two types of reconstruction filters and noise power spectra calculated from the tomographic images. Note that FIG. 6A shows a case of the low-pass reconstruction filter, and FIG. 6B shows a case of the high-pass reconstruction filter. The texture of the tomographic image differs between FIGS. 6A and 6B. The spatial frequency indicating the peak of noise power spectrum is higher in the case of the high-pass reconstruction filter than in the case of the low-pass reconstruction filter. That is, when a reconstruction filter corresponding to the modulation transfer function appropriate to the first component C1 including the structural component as a main component is used, the noise power spectrum in a frequency band corresponding to a superior passband of modulation transfer function is increased. Accordingly, it is not impossible with the reconstruction filter to perform frequency modulation to change the frequency distributions of the structural component and the noise component independently of each other.

(S503)

The modulation unit 302 calculates the modulation coefficient a(f) by spatial frequency based on the reconstruction filter obtained at S501 and the modulation transfer function corresponding to the reconstruction filter, and the noise power spectrum obtained at S502. The reconstructed medical image I includes the structural component of the modulation transfer function corresponding to the reconstruction filter used in the reconstruction and the noise component of the noise power spectrum. Hereinbelow, consecutive numbers are assigned to the multiple reconstruction filters stored in the storage device 4. The modulation transfer function corresponding to the k-th reconstruction filter is $p_k(f)$, and the noise power spectrum corresponding to the l-th reconstruction filter is $q_l(f)$. Further, the component of the spatial frequency f of a signal to noise ratio as an index representing the structural component detectability with respect to the noise component is $SNR_{lk}(f)$, and represented with the following expression.

$$SNR_{lk}(f) = \sqrt{(f^2 p_k^2(f) / q_l(f))} \quad (8)$$

That is, $SNR_{lk}(f)$ is an index representing the texture of the image obtained by combining the structural component of the k-th reconstruction filter and the noise component of the l-th reconstruction filter. The structural component detectability with respect to the noise component is improved by selecting k and l such that $SNR_{lk}(f)$ becomes larger with respect to the arbitrary spatial frequency f.

As an example of calculation of the modulation coefficient a(f), first, regarding k and l when k≠l holds, representative values of the signal to noise ratio obtained by integrating the expression (8) in the spatial frequency direction are calculated, and a combination of k' and l' when the representative values are the maximum is selected. Generally, since the reconstruction filter selected by the operator in image generation in the reconstruction processor 251 has a desired frequency characteristic of the structural component, k' is fixed to the reconstruction filter upon image reconstruction and l is scanned. Next, to modulate the second component C2 having the noise power spectrum corresponding to the k'-th reconstruction filter to the noise power spectrum corresponding to the l'-th reconstruction filter, the modulation coefficient a(f) is calculated with the following expression.

$$a(f) = q_{l'}(f) / q_{k'}(f) \quad (9)$$

When the characteristic of the reconstruction filter greatly differs in accordance with part, the possible combinations of k and l may be limited. As another method, it may be configured such that, using a phantom experiment, clinical data, and the like in place of the signal to noise ratio, l of a combination to obtain diagnostically desired frequency characteristic is previously set for the respective reconstruction filters and stored in the storage device 4. In this case, the noise power spectrum of the l'-th reconstruction filter linked to the reconstruction filter k' used in the reconstruction processor 251 is read from the storage device 4, and the modulation coefficient a(f) is calculated with the expression (9).

As further another method, it may be configured such that l of a combination to obtain an optimum frequency characteristic is previously set, and the modulation coefficient is calculated as a(f) with the expression (9) for the respective reconstruction filters and stored in the storage device 4. That is, assuming that the modulation coefficient of the k-th reconstruction filter is ak(f), $a_{k'}(f)$ linked to the reconstruction filter k' used in the reconstruction processor 251 is read from the storage device 4 and used.

Since the absolute values of the modulation transfer function and the noise power spectrum depend on the shape of the phantom used in the analysis and X-ray irradiation amount upon imaging through the above-described procedure, it may be configured such that the area is normalized in the frequency direction and then the modulation transfer function and the noise power spectrum are handled as absolute values.

(S504)

The modulation unit 302 multiplies the second component C2 by the modulation coefficient a(f) calculated at S503. The noise component as a main component of the second component C2 is frequency-modulated by multiplication by the modulation coefficient a(f) calculated at S503, based on the above-described signal to noise ratio, with respect to the first component C1, having a frequency characteristic corresponding to the reconstruction filter. Thus, the structural component detectability with respect to the noise component is improved.

Next, the description will be returned to FIG. 4.

(S403)

The correction unit 303 generates the corrected image Icorr. Specifically, with the expression (3) or (6), the corrected image Icorr is generated based on the first component C1(f) decomposed by spatial frequency and the modulated second component a(f)·C2(f). Note that when the expression (6) is used, the coefficients x and y are set by the operator. It is possible to reduce the noise component on the medical image I by minimizing y; however, an image with extremely small noise component provides a feeling of incompatibility and is not desirable. That is, it is desirable that the change of noise component intensity (total sum of the noise power spectrum in the frequency direction) before and after the frequency modulation is small.

With the above-described flow of processing, it is possible to frequency-modulate the noise component in the medical image so as to improve the structural component detectability with respect to the noise component.

Second Embodiment

In the first embodiment, the modulation of the second component C2 with the spatial frequency based on the reconstruction filter used in the reconstruction of the medical image I has been described. In the present embodiment, the modulation of the second component C2 based on an image interpretation parameter set by the operator along with the reconstruction filter used in the reconstruction of the medical image I will be described. Note that since the difference from the first embodiment is the flow of processing at S402 in FIG. 4, the explanation of the other processing will be omitted.

An example of the flow of processing to modulate the second component C2 with the spatial frequency in the present embodiment will be described by using FIG. 7.

(S701)

The modulation unit 302 obtains an image interpretation parameter, along with the reconstruction filter used in the reconstruction of the medical image I. The image interpretation parameter includes a central frequency f0, frequency band Δf, and a modulation intensity g. The image interpretation parameter is set by the operator via the input device 8. The central frequency f0 is a spatial frequency of interest upon image interpretation. The frequency band Δf is a width of the spatial frequency of interest. The modulation intensity g is a gain with respect to the spatial frequency of interest.

(S702)

The modulation unit 302 obtains the noise power spectrum of the reconstruction filter obtained at S701. As in the case of the first embodiment, the noise power spectrum by reconstruction filter is previously stored in the storage device 4. The noise power spectrum corresponding to the reconstruction filter obtained at S701 is read from the storage device 4.

(S703)

The modulation unit 302 calculates the modulation coefficient a(f) by spatial frequency based on the image interpretation parameter obtained at S701 and the noise power spectrum obtained at S702.

An example of the procedure of calculating the modulation coefficient a(f) at the present step will be described by using FIGS. 8A to 8F. At the present step, a correction spectrum set with the image interpretation parameter obtained at S701 is differentiated from the noise power spectrum obtained at S702 shown in FIG. 8A, and the modulation coefficient a(f) is calculated by using a differential spectrum obtained by the differentiation.

Figure 8A:
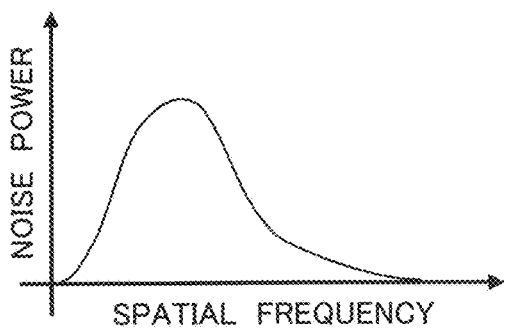
FIGS. 8A to 8F illustrate diagrams supplementary explaining a modulation coefficient according to the second embodiment.
Figure 8B:
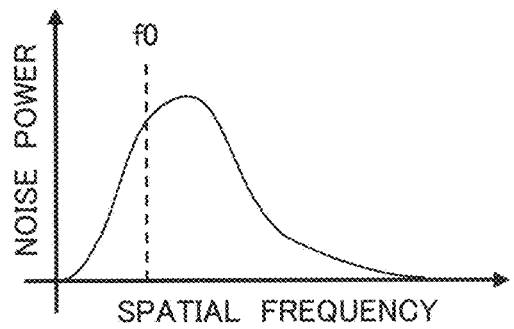
Figure 8C:
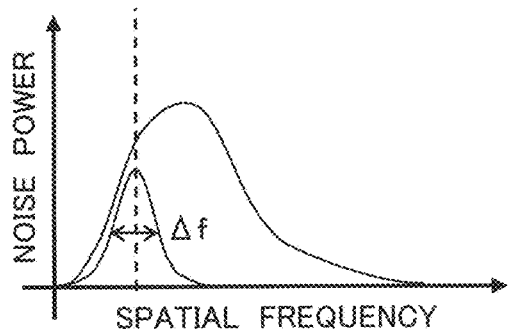
Figure 8D:
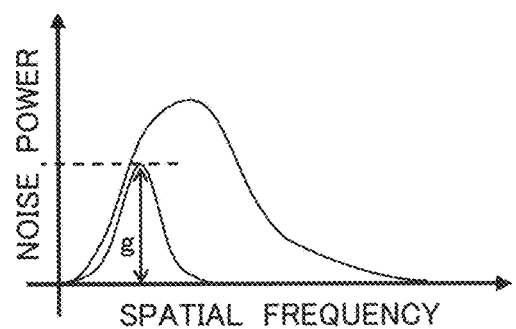

First, with respect to the noise power spectrum shown in FIG. 8A, the correction spectrum according to a normal distribution is set in correspondence with the central frequency f0 shown in FIG. 8B, the frequency band Δf shown in FIG. 8C, and the modulation intensity g shown in FIG. 8D. Note that the correction spectrum is not limited to the correction spectrum according to the normal distribution.

Figure 8E:
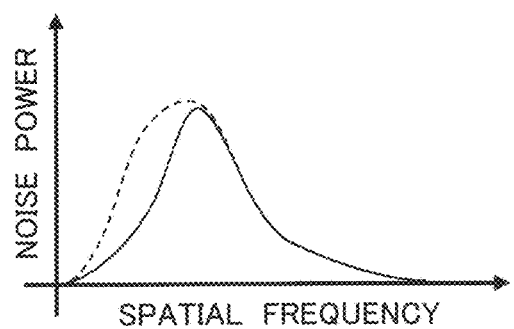

Next, the differential spectrum is obtained by differentiating the correction spectrum from the noise power spectrum. In FIG. 8E, the differential spectrum is indicated with a solid line, and the noise power spectrum is indicated with a dot line.

Then, the differential spectrum is normalized so as to have an area equal to the area of the noise power spectrum. Then, assuming that the noise power spectrum of the reconstruction filter upon image reconstruction in the reconstruction processor 251 is $q_m(f)$, and the normalized differential spectrum is $q_n(f)$, the modulation coefficient a(f) is calculated with the following expression.

$$a(f)=q_n(f)/q_m(f) \quad (10)$$

Figure 8F:
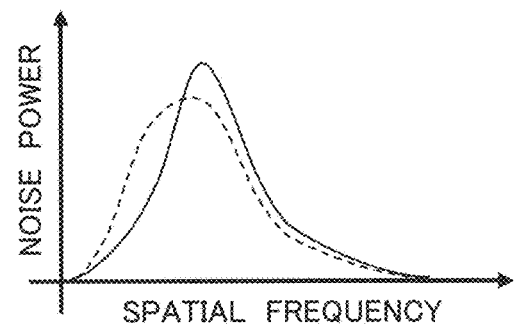

In FIG. 8F, the normalized differential spectrum is indicated with a solid line, and the noise power spectrum is indicated with a dot line. Note that it may be configured such that the both spectra shown in FIG. 8F are displayed on the display device 7 for the operator to visually check the spectra.

(S704)

The modulation unit 302 multiples the second component C2 by the modulation coefficient a(f) calculated at S703. With the multiplication by the modulation coefficient a(f) calculated at S703, the noise component as a main component of the second component C2, especially the noise component within the range of the spatial frequency corresponding to the image interpretation parameter is frequency-modulated. Accordingly, the structural component detectability with respect to the noise component within the range is further improved.

With the above-described flow of processing, the second component C2 including the noise component as a main component is modulated with the spatial frequency. Accordingly, it is possible to improve the structural component detectability with respect to the noise component. Especially, it is possible to improve the structural component detectability in correspondence with the image interpretation parameter set by the operator.

Third Embodiment

In the first embodiment, the prediction of the noise power spectrum of data obtained by imaging from the noise power spectrum previously analyzed by using a phantom based on the reconstruction filter used in the reconstruction of the medical image I, and the modulation of the second component C2 with the spatial frequency have been described. In the present embodiment, the modulation of the second component C2 based on a measured value of the noise power spectrum in a region of interest set by the operator will be described. Note that since the difference from the first embodiment is the flow of processing at S402 in FIG. 4, the explanation of the other processing will be omitted.

An example of the flow of processing to modulate the second component C2 with the spatial frequency in the present embodiment will be described by using FIG. 9.
(S901)
The modulation unit 302 obtains a pixel value in the region of interest. The region of interest is set with respect to the medical image I by the operator via the input device 8. It is desirable that the region of interest is set so as to include only the noise component.
(S902)
The modulation unit 302 calculates the noise power spectrum based on the pixel value in the region of interest obtained at S901. The noise power spectrum can be calculated based on well-known methods. For example, the noise power spectrum is calculated by using a virtual slit method or two-dimensional Fourier transform method.
(S903)
The modulation unit 302 calculates the modulation coefficient a(f) by spatial frequency based on the reconstruction filter obtained at S501 and the modulation transfer function corresponding to the reconstruction filter, and the noise power spectrum calculated at S902, as $q_I(f)$, based on the expression (9).
(S904)
The modulation unit 302 multiplies the second component C2 by the modulation coefficient a(f) calculated at S903. With the multiplication by the modulation coefficient a(f) calculated at S903, the frequency modulation is performed based on the noise component as a main component of the second component C2, especially on the noise component in the region of interest.

With the above-described flow of processing, the second component C2 including the noise component as a main component is modulated with the spatial frequency. Accordingly, it is possible to improve the structural component detectability with respect to the noise component. Especially, it is possible to improve the structural component detectability with respect to the noise component in the region of interest set by the operator.

Note that the medical image processing apparatus and the medical image processing method according to the present invention are not limited to the above-described embodiments, and can be embodied by modifying the constituent elements without departing from the scope of the invention. Further, the multiple constituent elements disclosed in the above-described embodiments may be arbitrarily combined. For example, the first to third embodiments may be combined so as to set the modulation coefficient based on the image interpretation parameter and the pixel value in the region of interest. Further, some constituent elements may be deleted from all the constituent elements shown in the above-described embodiments.

REFERENCE SIGNS LIST

1: medical image processing apparatus, 2: CPU, 3: memory, 4: storage device, 5: network adapter, 6: system bus, 7: display device, 8: input device, 10 medical imaging device, 11: medical image database, 100: X-ray CT device, 200: scanner, 210: subject, 211: X-ray tube, 212; detector, 213: collimator, 214: driver, 215: central controller, 216: X-ray controller, 217: high voltage generator, 218: scanner controller, 219: bed controller, 221: collimator controller, 222: preamplifier, 223: A/D converter, 240: bed, 250: operation unit, 251: reconstruction processor, 252: image processor, 254: storage unit, 256: display unit, 258: input unit, 301: separation unit, 302: modulation unit, 303: correction unit

What is claimed is:
1. A medical image processing apparatus for handling a medical image, comprising:
a separation processer that separates the medical image into a first component including a structural component as a first main component and a second component including a noise component as a second main component, and the separation processor performs a smoothing operation on the medical image to extract the first component and generates the second component by subtracting the first component from the medical image;
a modulation processor that modulates the second component with a spatial frequency by using a modulation coefficient calculated based on a reconstruction filter used in generation of the medical image, a modulation transfer function corresponding to the reconstruction filter, and a noise power spectrum of the reconstruction filter; and
a correction processor that generates a corrected image by adding the first component and the modulated second component by spatial frequency, wherein the corrected image contains a higher ratio of the structural component in the first component than the medical image by setting coefficients to adjust a balance between the first component and the modulated second component,
wherein an intensity of the smoothing operation is based on an estimate amount of the noise component.
2. The medical image processing apparatus according to claim 1, wherein the modulation processor modulates the second component by multiplying the second component by a modulation coefficient calculated with respect to the spatial frequency.

3. The medical image processing apparatus according to claim 2, wherein the modulation processor calculates the modulation coefficient based on a reconstruction filter used in generation of the medical image.

4. The medical image processing apparatus according to claim 3, wherein the modulation processor selects a second reconstruction filter, having the minimum overlap with a noise power spectrum of the reconstruction filter, from reconstruction filters different from the reconstruction filter, and calculates the modulation coefficient by using the noise power spectrum of the selected second reconstruction filter.

5. The medical image processing apparatus according to claim 3, further comprising an input device in which an image interpretation parameter is inputted,
    wherein the modulation processor calculates the modulation coefficient based on the noise power spectrum of the reconstruction filter and the image interpretation parameter.

6. The medical image processing apparatus according to claim 5,
    wherein the image interpretation parameter includes a central frequency, a frequency band, and a modulation intensity, and
    wherein the modulation processor calculates the modulation coefficient by using a differential spectrum, obtained by differentiating a correction spectrum set with the image interpretation parameter from the noise power spectrum.

7. The medical image processing apparatus according to claim 6, further comprising a display device that displays the differential spectrum, normalized to have an area equal to an area of the noise power spectrum, and the noise power spectrum.

8. The medical image processing apparatus according to claim 2, further comprising a setting processor that sets a region of interest in the medical image,
    wherein the modulation processor calculates the modulation coefficient based on a noise power spectrum calculated from a pixel value in the region of interest.

9. A medical image processing method for handling a medical image, comprising the steps of:
    separating the medical image into a first component including a structural component as a first main component and a second component including a noise component as a second main component;
    smoothing the medical image with an intensity based on an estimate amount of the noise component to extract the first component and generates the second component by subtracting the first component from the medical image;
    modulating the second component with a spatial frequency by using a modulation coefficient calculated based on a reconstruction filter used in generation of the medical image, a modulation transfer function corresponding to the reconstruction filter, and a noise power spectrum of the reconstruction filter; and
    generating a corrected image by adding the first component and the modulated second component by spatial frequency, wherein the corrected image contains a higher ratio of the structural component in the first component than the medical image by setting coefficients to adjust a balance between the first component and the modulated second component.

10. The medical image processing apparatus according to claim 3, wherein the reconstruction filter is at least one of a high-pass reconstruction filter or a low-pass reconstruction filter.

* * * * *